(12) United States Patent  
Sekine et al.

(10) Patent No.: US 9,162,696 B2
(45) Date of Patent: Oct. 20, 2015

(54) ELECTRIC ASSIST CART

(75) Inventors: Shinichi Sekine, Fukaya (JP); Osamu Miyatani, Kani (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/348,226

(22) PCT Filed: Sep. 10, 2012

(86) PCT No.: PCT/JP2012/073031
§ 371 (c)(1),
(2), (4) Date: Apr. 7, 2014

(87) PCT Pub. No.: WO2013/047165
PCT Pub. Date: Apr. 4, 2013

(65) Prior Publication Data
US 2014/0251704 A1    Sep. 11, 2014

(30) Foreign Application Priority Data

Sep. 30, 2011    (JP) .................................. 2011-217304

(51) Int. Cl.
| | | |
|---|---|---|
| *B62D 51/04* | (2006.01) | |
| *B62B 5/00* | (2006.01) | |
| *B62B 3/00* | (2006.01) | |
| *B60L 11/18* | (2006.01) | |
| *B60L 15/20* | (2006.01) | |

(52) U.S. Cl.
CPC ........... *B62B 5/0069* (2013.01); *B60L 11/1803* (2013.01); *B60L 11/1877* (2013.01);
(Continued)

(58) Field of Classification Search
CPC .. B62B 5/0026; B62B 5/0033; B62B 5/0036; B62B 5/004; B62B 5/0043; B62B 5/005; B62B 5/0059; B62B 5/0069; B62B 5/0073; Y02T 10/64; Y02T 10/642; Y02T 10/643; Y02T 10/644; Y02T 10/645
USPC ......... 180/65.1, 292, 19.1, 19.2, 19.3, 15, 11; 701/22, 70
See application file for complete search history.

(56) References Cited

U.S. PATENT DOCUMENTS 3,380,546 A * 4/1968 Rabjohn .......................... 180/15
5,746,282 A * 5/1998 Fujiwara et al. ............... 180/6.2
(Continued)

FOREIGN PATENT DOCUMENTS

| | | |
|---|---|---|
| JP | 10-006996 A | 1/1998 |
| JP | 10-109647 A | 4/1998 |

(Continued)

OTHER PUBLICATIONS

Mechanical translation of JP 10-006996, Jan. 13, 1998.*
(Continued)

*Primary Examiner* — John Walters
(74) *Attorney, Agent, or Firm* — Hauptman Ham, LLP

(57) ABSTRACT

An electric assist cart includes: a body frame where a burden can be loaded; a drive wheel provided in the body frame; a control handle by which an operator can input a driving force to the body frame; a torque sensor that detects a driving torque applied to the body frame by pushing and handling the control handle; an electric motor that applies an assisting force to the drive wheel depending on the driving torque detected by the torque sensor; and a controller that computes the assisting force applied to the drive wheel and supplies an electric current to the electric motor depending on the assisting force, wherein the controller has a plurality of modes having different characteristics for a change of a magnitude of the electric current depending on the driving torque, and the electric current can be supplied to the electric motor by switching the mode.

6 Claims, 5 Drawing Sheets

(52) U.S. Cl.
CPC .............. B60L 15/20 (2013.01); B62B 3/001 (2013.01); B62B 5/0033 (2013.01); B62B 5/0073 (2013.01); *B60L 2200/30* (2013.01); *B60L 2240/423* (2013.01); *B60L 2270/145* (2013.01); *B62B 2203/10* (2013.01); *B62B 2301/20* (2013.01); *Y02T 10/642* (2013.01); *Y02T 10/7005* (2013.01); *Y02T 10/705* (2013.01); *Y02T 10/7275* (2013.01)

(56) References Cited

U.S. PATENT DOCUMENTS

| | | | |
|---|---|---|---|
| 6,276,471 B1 * | 8/2001 | Kratzenberg et al. | 180/19.3 |
| 8,672,081 B2 * | 3/2014 | Kume et al. | 180/292 |
| 2011/0015842 A1 | 1/2011 | Kume et al. | |

FOREIGN PATENT DOCUMENTS

| | | |
|---|---|---|
| JP | 2002-067964 A | 3/2002 |
| JP | 2006-290319 A | 10/2006 |
| JP | 2011-148330 A | 8/2011 |
| WO | 2010/087115 A1 | 8/2010 |

OTHER PUBLICATIONS

Mechanical translation of JP 2002-067964, Mar. 8, 2002.*
Mechanical translation of JP 2011-148330, Aug. 5, 2010.*
ISR and WO for PCT/JP2012/073031 mailed Dec. 18, 2012.
Office Action mailed Feb. 3, 2015, corresponding to Japanese patent application No. 2011-217304.

* cited by examiner

ELECTRIC ASSIST CART

RELATED APPLICATIONS

The present application is a National Phase of International Application Number PCT/JP2012/073031 filed Sep. 10, 2012 and claims priority to Japanese Application Number 2011-217304 filed Sep. 30, 2011.

TECHNICAL FIELD

This invention relates to an electric assist cart in which a driving force is assisted by an electric motor.

BACKGROUND ART

In general, when a heavy burden is loaded on a handcart used in a factory or the like, an operator necessarily pushes the handcart with a strong force at the start of delivery. This is a hard work.

As a countermeasure for this problem, JP 2006-290319 A proposes an electric assist hand-push cart in which an operator's force applied to the handcart is detected, and an subsidiary power corresponding to the human power is applied from an electric motor. In this electric assist hand-push cart, a force applied by an operator in forward and backward movements is assisted depending on the handling of a hand-push frame body from an operator.

SUMMARY OF INVENTION

However, in the electric assist hand-push cart disclosed in JP 2006-290319 A, a magnitude of the subsidiary power is constant regardless of a load amount of the burden. In this case, the same subsidiary power is applied in both the unloaded state and the maximum loaded state. For this reason, an operator may feel uncomfortable in controllability depending on a weight of the burden.

It is therefore an object of this invention to improve controllability of the electric assist cart.

According to one aspect of this invention, an electric assist cart that can travel by virtue of an assisting force in addition to a driving force applied by an operator is provided. The electric assist cart includes: a body frame where a burden can be loaded; a drive wheel provided in the body frame; a handling portion pushed and handled by an operator to input a driving force to the body frame; a torque detection portion that detects a driving torque applied to the body frame by pushing and handling the handling portion; an electric motor that applies an assisting force to the drive wheel depending on the driving torque detected by the torque detection portion; and a controller that computes the assisting force applied to the drive wheel and supplies an electric current to the electric motor depending on the assisting force. The controller has a plurality of modes having different characteristics for a change of a magnitude of the electric current depending on the driving torque, and the electric current can be supplied to the electric motor by switching the mode.

The details as well as other features and advantages of this invention are set forth in the remainder of the specification and are shown in the accompanying drawings.

DESCRIPTION OF EMBODIMENTS

Figure 1:
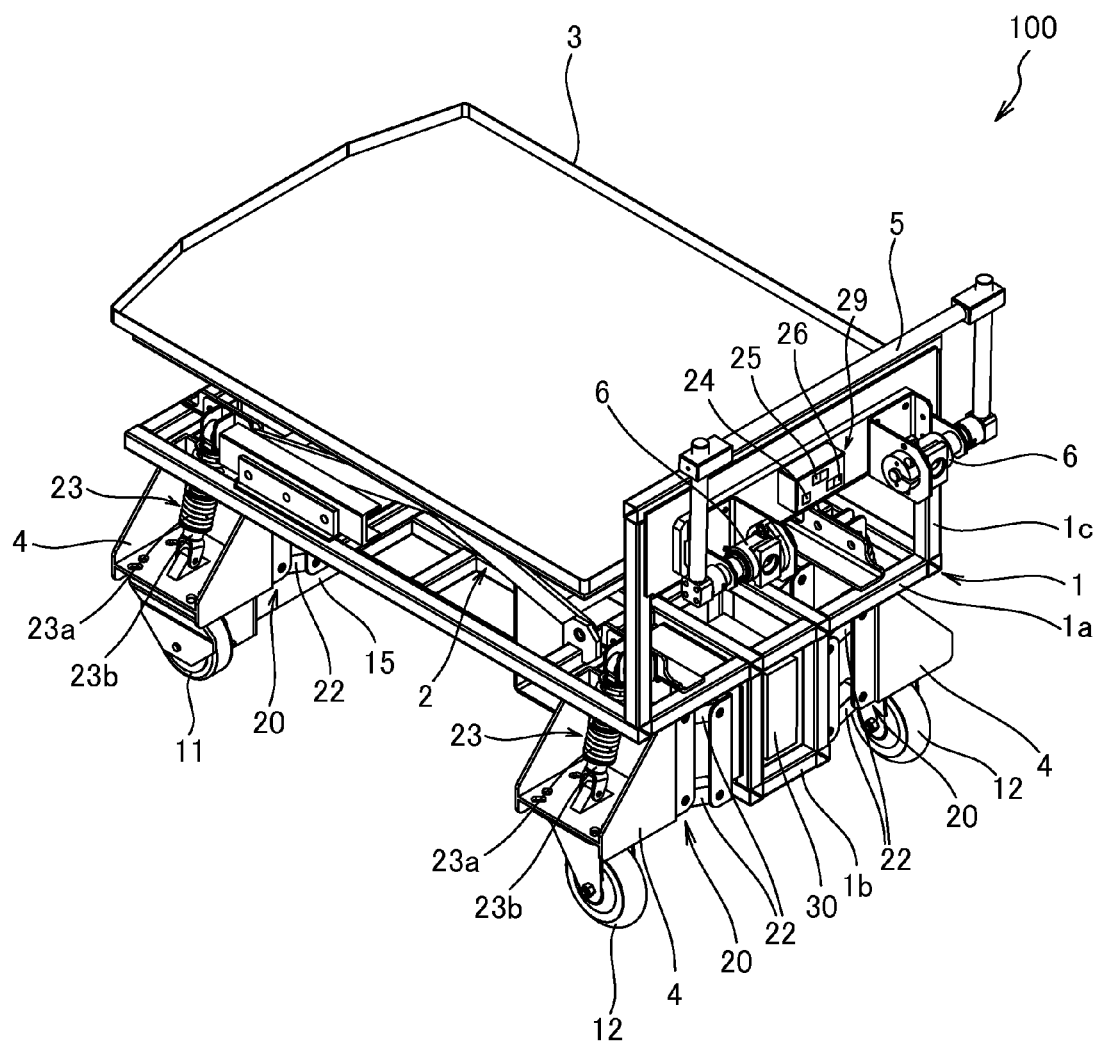
FIG. 1 is a perspective view illustrating an electric assist cart according to an embodiment of the present invention.

Hereinafter, embodiments of the present invention will be described with reference to the accompanying drawings.

First, an electric assist cart 100 according to an embodiment of the present invention will be described with reference to FIGS. 1 to 5.

The electric assist cart 100 is used to carry a heavy burden, for example, in a factory or the like. The electric assist cart 100 travels by virtue of an assisting force caused by rotation of an electric motor 15 described below in addition to a driving force from an operator.

The electric assist cart 100 includes a body frame 1, a deck 3 provided on the body frame 1 to load a burden, a control handle 5 as a handling portion by which a driving force can be input from both left and right portions of the body frame 1, a pair of drive wheels 11 provided in both left and right sides of the body frame 1 with an interval, and a pair of universal wheels 12 installed in the body frame 1 in rear of the drive wheels 11. The drive wheels 11 are front wheels of the electric assist cart 100, and the universal wheels 12 are rear wheels of the electric assist cart 100.

The body frame 1 is a frame obtained by combining rectangular pipes. The body frame 1 includes a planar portion 1a where a burden is loaded using a deck 3, a lower projecting portion 1b projecting in the lower side of the planar portion 1a, and an erected portion 1c erected on the upper portion of the rear end of the planar portion 1a.

The deck 3 is a rimmed flat plate provided to cover the top of the planar portion 1a of the body frame 1. A burden is directly loaded on the deck 3. The deck 3 may be an unrimmed flat plate. In addition, instead of the deck 3, a roller conveyor may be installed on the body frame 1, and a burden may be loaded using the roller conveyor.

Figure 2:
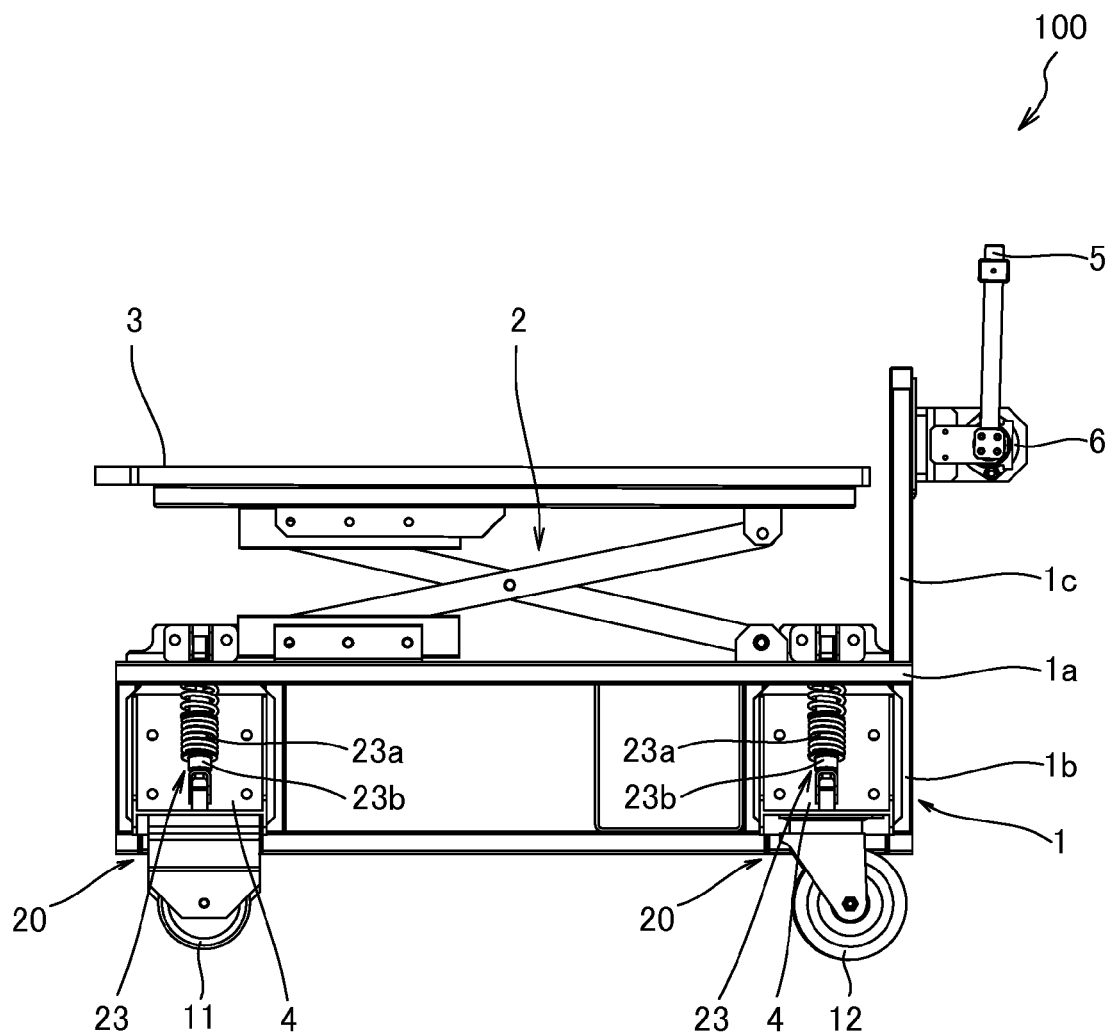
FIG. 2 is a side view of FIG. 1.

As illustrated in FIG. 2, a lift unit 2 is provided between the body frame 1 and the deck 3. This lift unit 2 lifts or lowers the deck 3 against the body frame 1 using an electric lift cylinder 2a (refer to FIG. 4). For example, when a heavy burden is loaded on the deck 3, and the body frame 1 sinks to the drive wheel 11 and the universal wheel 12 by means of a suspension unit 20 described below, the lift unit 2 may lift the deck 3 to constantly maintain a height of the deck 3 from the road surface.

The electric lift cylinder 2a is electrically connected to a controller 30 described below and expands or contracts in response to an instruction signal from the controller 30. The electric lift cylinder 2a is an electric hydraulic linear actuator provided with a hydraulic pump driven by a motor so as to expand or contract by a pressure of the hydraulic fluid discharged from the hydraulic pump.

The control handle 5 is a reversed U-shaped handle pushed and handled by an operator as illustrated in FIG. 1. Both left and right ends of the control handle 5 are connected to the erected portion 1c of the body frame 1. As a result, a driving force input when an operator handles the control handle 5 is transmitted to the body frame 1.

The drive wheel 11 is a small wheel unturnably provided in a longitudinal direction of the body frame 1. A pair of drive wheels 11 are provided in the vicinity of the front end of the body frame 1. The drive wheels 11 are fixed to the lower projecting portion 1b of the body frame 1 movably upward and downward.

The universal wheel 12 is a small wheel directed to a movement direction at all times when the cart travels. The universal wheel 12 turns by a frictional resistance with the road surface to steer the cart toward a movement direction. The universal wheel 12 is fixed to the lower projecting portion 1b of the body frame 1 movably upward and downward.

The electric assist cart 100 includes four subsidiary frames 4 movable upward and downward against the body frame 1 and a suspension unit 20 that suspends the driving wheels 11 and the universal wheels 12 from the subsidiary frame 4.

Four subsidiary frames 4 are provided for a pair of drive wheels 11 and a pair of universal wheels 12. Two subsidiary frames 4 are arranged in each of the left and right sides of the body frame 1. The drive wheel 11 or the universal wheel 12 is rotatably fixed to the lower surface of each subsidiary frame 4.

The suspension unit 20 includes four suspension arms 22 for supporting the left and right subsidiary frames 4 to the body frame 1 movably upward and downward and spring dampers 23 provided between the body frame 1 and the left and right subsidiary frames 4.

Four suspension arms 22 are provided for a single subsidiary frame 4. Both ends of each suspension arm 22 are connected to the body frame 1 and the left and right subsidiary frames 4 pivotably around a horizontal axis, so that the suspension arm 22 serves as a parallel link mechanism that supports the subsidiary frame 4 against the body frame 1 to allow for parallel displacement.

As a result, even when the subsidiary frame 4 is lifted or lowered against the body frame 1, a posture of the subsidiary frame 4 does not change, and a positional relationship (alignment) between the drive wheel 11 and the universal wheel 12 is maintained constantly. Therefore, even when the subsidiary frame 4 is lifted or lowered, it is possible to suppress one of the drive wheel 11 and the universal wheel 12 from floating from the road surface.

The spring damper 23 absorbs or dampens vertical vibration in the drive wheel 11 and the universal wheel 12 caused by an unprepared road surface or the like and suppresses the vibration from the road surface from being transmitted to the body frame 1. The spring damper 23 has a coil spring 23a and a damper 23b. The spring damper 23 expands or contracts as the subsidiary frame 4 is lifted or lowered.

The coil spring 23a supports a load applied to the subsidiary frame 4 by virtue of its spring force. The coil spring 23a expands or contracts as the subsidiary frame 4 is lifted or lowered.

A hydraulic fluid filled in the damper 23b passes through a damping valve (not illustrated) as the coil spring 23a expands or contracts, so that the damper 23b generates a damping force for suppressing vibration of the subsidiary frame 4. The damper 23b has a stroke sensor 23c (refer to FIG. 4) for detecting a stroke amount that changes depending on a weight of the burden loaded on the deck 3. The stroke of the damper 23b increases as the weight of the burden increases. The stroke sensor 23c is provided in at least one of four dampers 23b.

It is noted that a configuration of the suspension unit 20 is not limited to that described above, but other configurations may be possible if a posture of the subsidiary frame 4 against the body frame 1 is maintained.

The electric assist cart 100 includes: a torque sensor 6 serving as a pair of torque detection parts for detecting a driving torque applied to each of the left and right portions of the body frame 1 as the control handle 5 is pushed and handled; a pair of electric motors 15 for applying an assisting force to each drive wheel 11 depending on the driving torque detected by the torque sensor 6; a controller 30 that computes the assisting force applied to the drive wheel 11 and supplies an electric current corresponding to the assisting force to the electric motor 15; a pair of brakes 16 that brakes rotation of each drive wheel 11; and a console 29 provided with various switches that can be manipulated by an operator.

The torque sensor 6 is electrically connected to the controller 30 and outputs an electric signal corresponding to the detected driving torque to the controller 30. The torque sensor 6 includes: a torsion bar (not illustrated) connected between the control handle 5 and the body frame 1 and twisted by the driving force input from the handling portion while the driving force is transmitted to the body frame 1; and a potentiometer (not illustrated) that outputs an electric signal corresponding to the torsion of the torsion bar. The torque sensor 6 detects the driving torque based on the torsion of the torsion bar. By changing the torsion bar provided in the torque sensor 6, it may also be possible to change a handling sense of an operator depending on a live load of the cart without changing other members.

Figure 3:
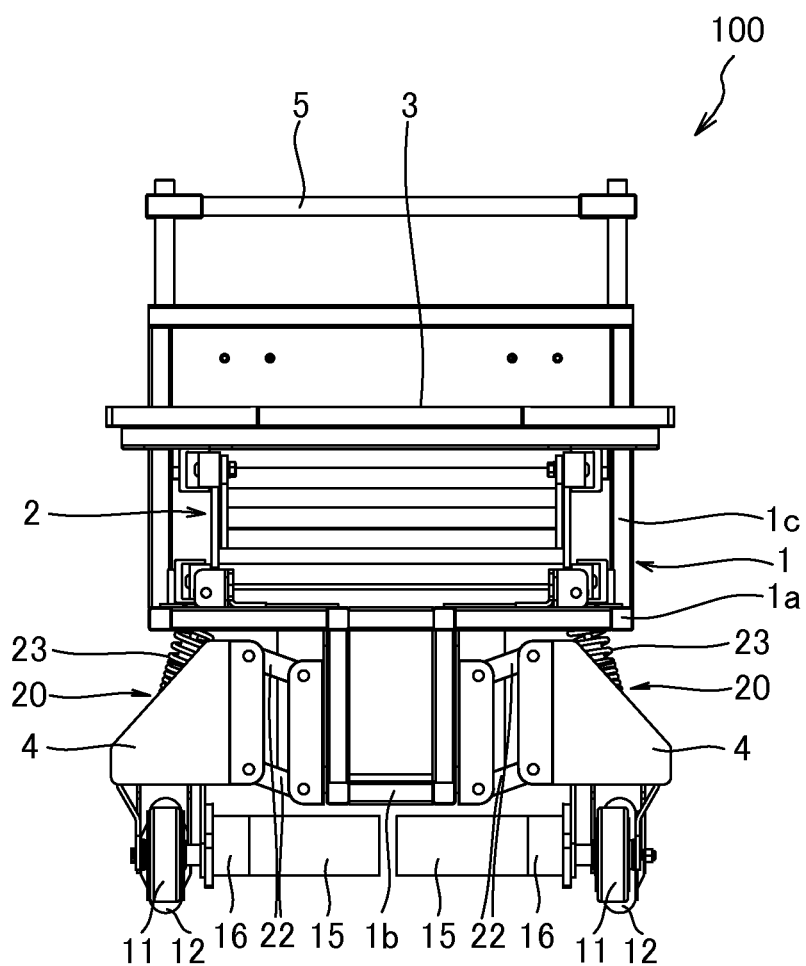
FIG. 3 is a front view of FIG. 1.
Figure 4:
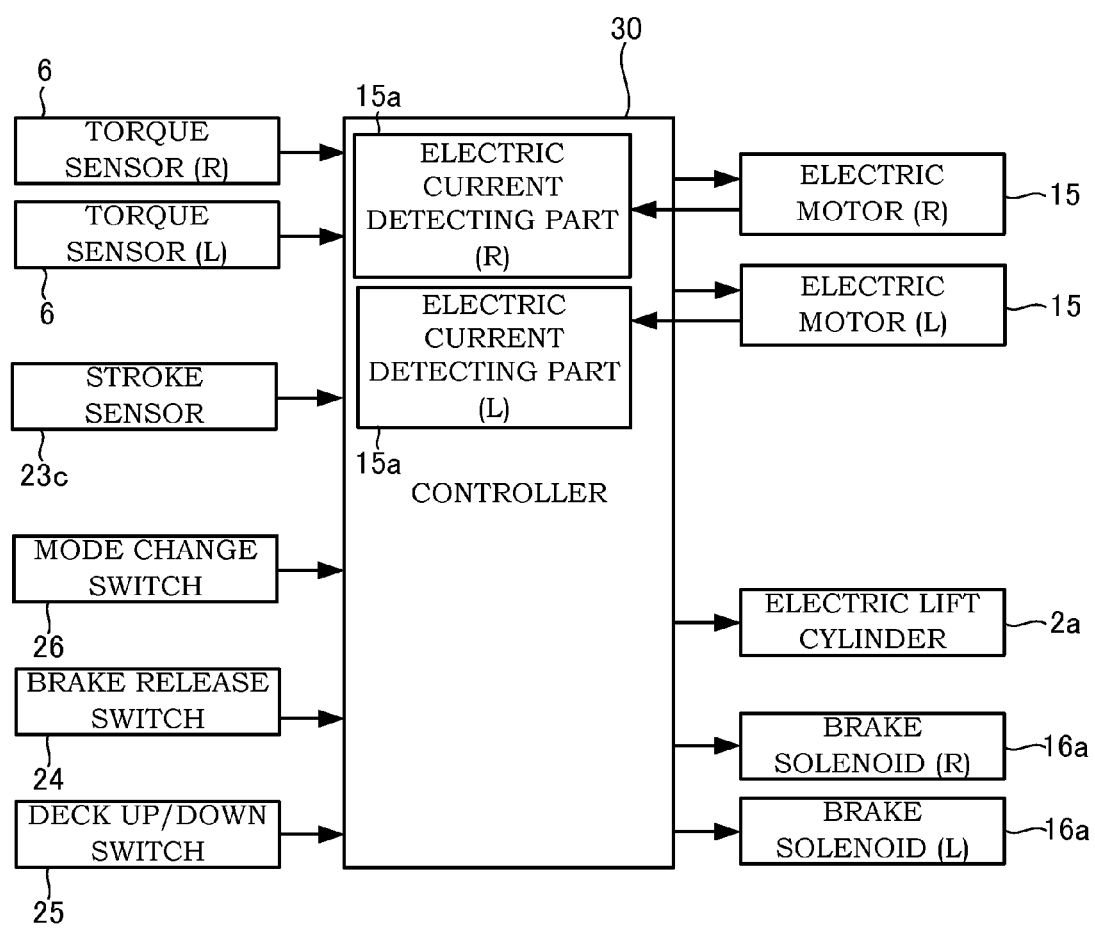
FIG. 4 is a control block diagram of the electric assist cart.

The electric motor 15 is electrically connected to the controller 30 and is rotated depending on the electric signal input from the controller 30. As illustrated in FIG. 3, the electric motor 15 is arranged inside the drive wheel 11 to apply an assisting force to the driving wheel 11. The left and right electric motors 15 are coaxially provided and arranged in series between a pair of the drive wheels 11. The electric motor 15 has a transmission (not illustrated) that transmits rotation to the drive wheel 11 by decelerating the rotation.

The brake 16 is arranged between an output shaft of the electric motor 15 and the drive wheel 11. The brake 16 has a brake solenoid 16a (refer to FIG. 4) that can switch between a braking state and an unbraking state. When the brake 16 switches to the braking state, the brake 16 fixes the drive wheel 11 to a rotation disable state.

The brake solenoid 16a is electrically connected to the controller 30 and switches depending on an electric current supplied from the controller 30. While no electric current flows to the brake solenoid 16a, the brake 16 maintains the drive wheel 11 in the braking state. Meanwhile, when an electric current flows to the brake solenoid 16a, the brake 16 switches the drive wheel 11 to the unbraking state.

The controller 30 is mounted on the body frame 1 along with a power supply (not illustrated) or other electronic devices (not illustrated). The controller 30 performs control of the electric assist cart 100 and is a microcomputer having a central processing unit (CPU), a read-only memory (ROM), a random access memory (RAM), and an input/output (I/O) interface. The RAM stores data for the processing of the CPU, and the ROM stores a control program or the like of the CPU in advance. The I/O interface is used to input or output information from/to a connected device. Control of the electric assist cart 100 is implemented by operating the CPU or the RAM based on the program stored in the ROM.

The controller 30 is operated based on the power supplied from the power supply. When a voltage of the power supply abruptly decreases, the controller 30 stops overall control and sets the CPU to a sleep state. Assuming that a battery of 24 V is used as the power supply, the CPU is set to the sleep state, for example, when the voltage drops to, approximately, 18 V. As a result, it is possible to protect the controller 30 from an abrupt drop of the voltage of the power supply.

The controller 30 performs control such that the assisting forces for the left and right electric motors 15 are generated depending on the driving torque detected by the left and right torque sensors 6 in order to move the electric assist cart 100 forward or backward and apply an assisting force in a straight movement, a turning movement, and a curve movement.

The controller 30 drives the electric motor 15 on a pulse width modulation (PWM) control basis. The controller 30 has a pair of electric current detection parts 15a for detecting an electric current value flowing through the left and right electric motors 15 in practice. As a result, it is possible to perform a feedback control for the electric motor 15.

The controller 30 has a plurality of modes having different characteristics for a change of the magnitude of the electric current depending on the driving torque. The controller 30 has a plurality of maps created in advance to match a plurality of modes. The controller 30 switches to one mode selected from a plurality of modes to supply an electric current to the electric motor 15 based on the map matching that mode.

The console 29 is arranged on the rear face of the erected portion 1c of the body frame 1 as illustrated in FIG. 1. The console 29 is electrically connected to the controller 30. The position of the console 29 is not particularly limited if the console 29 is provided in a position where an operator can manipulate and see it. The console 29 includes: a brake release switch 24 for switching the brake solenoid 16a; a deck up/down switch 25 for controlling an electric lift cylinder 2a; and a mode change switch 26 for switching between a plurality of modes of the controller 30.

The brake release switch 24 is a switch capable of switching the brake solenoid 16a based on an operator's manipulation. As an operator manipulates the brake release switch 24, an electric current flows through the brake solenoid 16a, and the drive wheel 11 switches to an unbraking state. As a result, the electric assist cart 100 can travel.

The deck up/down switch 25 is a switch for operating the electric lift cylinder 2a based on an operator's manipulation. As an operator manipulates the deck up/down switch 25, the electric lift cylinder 2a expands or contracts. As a result, the deck 3 is lifted or lowered against the body frame 1.

The mode change switch 26 is a switch for selecting one from a plurality of modes of the controller 30 based on the manipulation of an operator. As the mode change switch 26 is manipulated, the controller 30 switches between several modes including a comfort mode as a first mode indicated by a solid line of FIG. 5 and an eco mode as a second mode indicated as a dotted line of FIG. 5.

Figure 5:
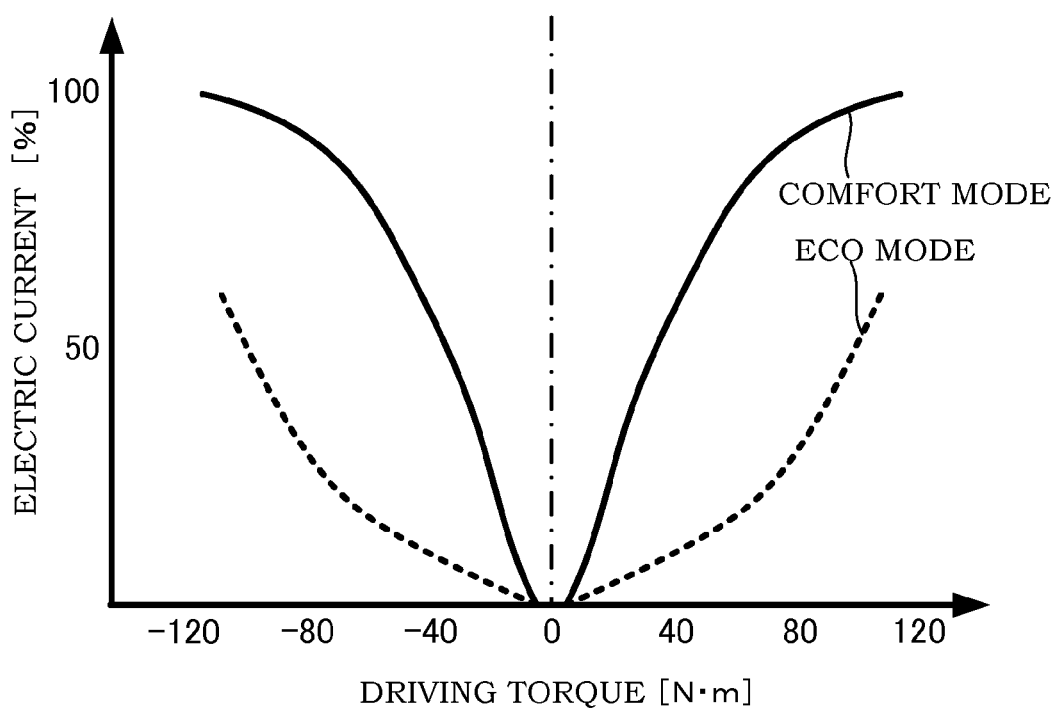
FIG. 5 is a graph obtained by plotting an electric current change versus a driving torque in a plurality of modes.

In FIG. 5, the abscissa indicates a magnitude of the driving torque detected by the torque sensor 6, and the ordinate indicates a magnitude of the electric current supplied to the electric motor 15. The driving torque is represented as a positive value when a driving torque for moving the electric assist cart 100 forward is input. The driving torque is represented as a negative value when a driving torque for moving the electric assist cart 100 backward is input. In the following description, an absolute value of the magnitude of the driving torque is simply represented as a magnitude of the driving torque. In addition, the electric current is represented as 100% when the assisting force is at maximum.

The comfort mode or the eco mode is set depending on the map of FIG. 5. If a change of the magnitude of the electric current supplied to the electric motor 15 is set based on the map in this manner, it is possible to freely set the output characteristic of the assisting force in a linear or non-linear manner. As a result, it is possible to set a change of the magnitude of the electric current supplied to the electric motor 15 such that an operator feels a spontaneous handling sense when the operator performs handling.

It is noted that the number of modes is not limited to two, but the mode may be selected from three or more modes. In addition, the maps corresponding to each mode may be updated by externally connecting a personal computer (PC) or the like to the controller 30. As a result, it is possible to change the setting as desired depending on a weight of the burden loaded on the deck 3 or a strength of the pushing force from an operator.

The comfort mode is a mode used when a weight of the burden is relatively heavy or when a pushing force from an operator is relatively weak. In the comfort mode, as illustrated in FIG. 5, the electric current is set to increase gradually as the driving torque increases. In the comfort mode, the electric current supplied to the electric motor 15 is set to be 100% when the driving torque is maximized.

In the comfort mode, an increasing rate of the electric current is high while the driving torque is small. In addition, the increasing rate of the electric current decreases as the driving torque increases. As a result, when a high driving force is necessary at the start of operation of the electric assist cart 100 or the like, the assisting force is set to be strong. Therefore, an operator can comfortably push the electric assist cart 100.

Meanwhile, the eco mode is a mode used when a weight of the burden is lighter relative to the comfort mode or when a pushing force from an operator is relatively strong. In the eco mode, as illustrated in FIG. 5, the electric current is set to be lower relative to the comfort mode across the entire range of the driving torque. In the eco mode, the setting is made such that the electric current supplied to the electric motor 15 is suppressed to, approximately, 60% even when the driving torque is maximized. As a result, it is possible to suppress a power consumption of the electric assist cart 100 by setting the eco mode.

In the eco mode, an increasing rate of the electric current is lower relative to the comfort mode while the driving torque is low. In addition, the increasing rate of the electric current increases relative to the comfort mode as the driving torque increases.

Instead of providing the mode change switch 26, the sinking level of the body frame 1 may be detected based on the stroke amount detected by the stroke sensor 23c provided in the damper 23b, and the weight of the burden may be computed based on this sinking level.

As a result, by computing the weight of the burden based on the stroke amount detected by the stroke sensor 23c, it is possible to automatically switch the mode depending on the weight of the burden. In this case, the stroke sensor 23c corresponds to a weight detection portion. Instead of the stroke sensor 23c, other elements such as a weight sensor capable of detecting a weight of the burden loaded on the deck 3 may also be employed as the weight detection portion.

In this case, a plurality of modes are set depending on the weight of the burden loaded on the deck 3. Specifically, a plurality of modes are set such that the electric current supplied to the electric motor 15 decreases as the weight of the burden loaded on the deck 3 decreases while the same driving torque is detected.

Next, a driving operation of the electric assist cart 100 will be described.

When an operator pushes the control handle 5 with both hands in parallel, the electric assist cart 100 moves forward straightly. In this case, the driving force input to the body frame 1 by pushing the control handle 5 is approximately equal between the left and right sides of the control handle 5. Therefore, the driving torques detected by left and right torque sensors 6 are also approximately equal to each other.

If the left and right torque sensors 6 detect an equal driving torque, the controller 30 instructs that the assisting force is equally applied to the left and right driving wheels 11 from the left and right electric motors 15. As a result, the assisting force is equally applied to the left and right drive wheels 11.

Therefore, the electric assist cart 100 moves forward straightly by virtue of the assisting force of the electric motor 15 in addition to the driving force applied by an operator.

It is noted that, when the electric assist cart 100 moves backward straightly, the pushing direction of the control handle 5 and the rotation direction of the electric motor 15 are reversed, and other actions are similar to those of the case where the electric assist cart 100 moves forward straightly.

Meanwhile, when an operator applies the pushing force to the control handle 5 differently between the left and right sides, the electric assist cart 100 turns left or right. In this case, the assisting force is differently applied to the left and right drive wheels 11 from the left and right electric motors 15.

Specifically, for example, when the electric assist cart 100 turns left, the pushing force applied to the control handle 5 by a right hand of an operator is stronger than the pushing force applied to the control handle 5 by a left hand of an operator. Therefore, the driving torque detected by the right torque sensor 6 is higher than the driving torque detected by the left torque sensor 6.

As a result, the controller 30 instructs that the assisting force applied from the right electric motor 15 to the drive wheel 11 is stronger than the assisting force applied from the left electric motor 15 to the drive wheel 11. As a result, the assisting force applied to the right drive wheel 11 becomes relatively stronger than the assisting force applied to the left drive wheel 11.

It is noted that the magnitude of the assisting force can be controlled depending on the pushing force applied by an operator to the control handle 5 because the left and right torque sensors 6 can detect the driving torque steplessly.

Here, for example, when a maximum load of the burden is placed on the deck 3, or the pushing force of an operator is relatively weak, the operator manipulates the mode change switch 26 to switch to the comfort mode. In the comfort mode, a strong assisting force is applied while the driving torque detected by the torque sensor 6 is relatively weak. Therefore, an operator can drive the electric assist cart 100 by applying a weak force.

Meanwhile, when no burden is loaded on the deck 3, the burden loaded on the deck 3 is relatively light, or the pushing force of an operator is relatively strong, an operator manipulates the mode change switch 26 to switch to the eco mode. In the eco mode, the assisting force is suppressed to be weak while the driving torque detected by the torque sensor 6 is relative weak. Therefore, when no burden is loaded on the deck 3, or the burden loaded on the deck 3 is relatively light, the assisting force can be set to an appropriate value.

When the weight of the burden loaded on the deck 3 is heavy in the eco mode, an operator is necessary to strongly push the control handle 5. In this case, if an operator continuously and strongly pushes the control handle 5, the electric current supplied to the electric motor 15 increases gradually as the driving torque increases. Therefore, the assisting force also increases gradually.

As described above, the electric current supplied to the electric motor 15 for applying the assisting force to the drive wheel 11 can switch between the comfort mode and the eco mode having different characteristics for a change of the magnitude depending on the driving torque. For this reason, it is possible to perform the setting such that an appropriate assisting force is applied to the drive wheel 11 by switching the mode. Therefore, it is possible to improve controllability of the electric assist cart 100.

When the weight of the burden loaded on the deck 3 is light, an operator may manipulate the mode change switch 26 to switch to the eco mode to suppress a power consumption of the electric assist cart 100. Therefore, it is possible to reduce a size of the power supply and lengthen a service time when the power supply has the same capacity.

According to the aforementioned embodiment, the following effects can be obtained.

The electric current supplied to the electric motor 15 for applying the assisting force to the drive wheel 11 can switch between the comfort mode and the eco mode having different characteristics for a change of the magnitude depending on the driving torque. For this reason, by switching the mode, it is possible to perform a setting such that an appropriate assisting force is applied to the drive wheel 11. Therefore, it is possible to improve controllability of the electric assist cart 100.

Embodiments of this invention were described above, but the above embodiments are merely examples of applications of this invention, and the technical scope of this invention is not limited to the specific constitutions of the above embodiments.

This application claims priority based on Japanese Patent Application No. 2011-217304 filed with the Japan Patent Office on Sep. 30, 2011, the entire contents of which are incorporated into this specification.

The embodiments of this invention in which an exclusive property or privilege is claimed are defined as follows:

1. An electric assist cart moveable by virtue of an assisting force in addition to a driving force applied by an operator, the electric assist cart comprising:
   a body frame where a burden is loadable;
   a drive wheel provided in the body frame;
   a handling portion configured to be pushed and handled by an operator to input a driving force to the body frame;
   a torque detection part configured to detect a driving torque applied to the body frame by pushing and handling the handling portion;
   an electric motor configured to apply an assisting force to the drive wheel depending on the driving torque detected by the torque detection part; and
   a controller configured to compute the assisting force applied to the drive wheel and supply an electric current to the electric motor depending on the assisting force, wherein
   the controller has a plurality of modes having different characteristics for a change of a magnitude of the electric current depending on the driving torque, and the electric current is suppliable to the electric motor by switching the mode,
   the plurality of modes includes a first mode in which the electric current increases as the driving torque increases, and a second mode in which the electric current is weaker than that of the first mode across an entire range of the driving torque, and
   in the first mode, an increasing rate of the electric current decreases as the driving torque increases.

2. The electric assist cart according to claim 1, wherein
   in the second mode, an increasing rate of the electric current increases relative to the first mode as the driving torque increases.

3. The electric assist cart according to claim 1, wherein
   the second mode is set when a weight of a burden is light relative to the first mode.

4. The electric assist cart according to claim 1, wherein the plurality of modes are selected by a mode change switch configured to be manipulated by an operator.

5. The electric assist cart according to claim 1, further comprising:
 a weight detection part configured to detect a weight of a burden loaded on the body frame, wherein
 the controller is configured to switch the plurality of modes depending on the weight of the burden detected by the weight detection part.

6. An electric assist cart moveable by virtue of an assisting force in addition to a driving force applied by an operator, the electric assist cart comprising:
 a body frame where a burden is loadable;
 a drive wheel provided in the body frame;
 a handling portion configured to be pushed and handled by an operator to input a driving force to the body frame;
 a torque detection part configured to detect a driving torque applied to the body frame by pushing and handling the handling portion;
 an electric motor configured to apply an assisting force to the drive wheel depending on the driving torque detected by the torque detection part;
 a controller configured to compute the assisting force applied to the drive wheel and supply an electric current to the electric motor depending on the assisting force;
 a weight detection part configured to detect a weight of a burden loaded on the body frame; and
 a suspension unit that suspends the wheel against the body frame, wherein
 the controller has a plurality of modes having different characteristics for a change of a magnitude of the electric current depending on the driving torque, and the electric current is suppliable to the electric motor by switching the mode,
 the weight detection part is configured to detect the weight of the burden based on a sinking level of the body frame, and
 the controller is configured to switch the plurality of modes depending on the weight of the burden detected by the weight detection part.

* * * * *